(12) United States Patent
Di Rosa

(10) Patent No.: US 6,474,460 B2
(45) Date of Patent: Nov. 5, 2002

(54) PROCESSING PLANT WITH DEVICE FOR HOLDING AND CENTERING BODIES IN PROCESSING STATIONS

(75) Inventor: Gaetano Di Rosa, Pino Torinese (IT)

(73) Assignee: Advanced Technologies S.r.l., Pianezza (IT)

( * ) Notice: Subject to any disclaimer, the term of this patent is extended or adjusted under 35 U.S.C. 154(b) by 0 days.

(21) Appl. No.: 09/735,658

(22) Filed: Dec. 14, 2000

(65) Prior Publication Data

US 2001/0042672 A1 Nov. 22, 2001

(30) Foreign Application Priority Data

Dec. 17, 1999 (IT) ........................................ MI990758 U

(51) Int. Cl.⁷ .............................................. B65G 47/22
(52) U.S. Cl. ................................ 198/345.1; 198/345.2; 198/345.3; 198/867.07
(58) Field of Search ....................... 198/867.07, 867.09, 198/345.1, 345.2, 345.3; 269/48.2, 54.3, 298

(56) References Cited

U.S. PATENT DOCUMENTS

| | | | | |
|---|---|---|---|---|
| 3,096,679 A | * | 7/1963 | Jones | 269/48.2 |
| 3,139,785 A | * | 7/1964 | Harwood | 269/48.2 |
| 4,731,151 A | * | 3/1988 | Kaller et al. | 269/48.1 |
| 4,924,996 A | * | 5/1990 | Svensson et al. | 198/341 |
| 5,313,695 A | * | 5/1994 | Negre et al. | 198/345.3 |
| 5,595,376 A | * | 1/1997 | Hua | 269/48.1 |
| 5,865,577 A | * | 2/1999 | Kim | 29/56.6 |
| 6,196,372 B1 | * | 3/2001 | Rossi | 198/345.1 |
| 6,241,228 B1 | * | 6/2001 | Chupick | 269/48.1 |

* cited by examiner

Primary Examiner—Douglas Hess
(74) Attorney, Agent, or Firm—Jacobson Holman, PLLC

(57) ABSTRACT

A plant for assembly of bodies with work stations and conveyance devices for conveying bodies between work stations. The conveyance devices include reference members assembled transitorily on the conveyance devices to support the body on the conveyance devices during transfer between work stations. Grasping devices are assembled in the work stations for grasping the reference members and positioning them accurately while temporarily disengaging them from the conveyance devices to accurately position the body supported on the reference members in the station space. The reference members include a grasping device to grasp the body and holding it steadily against them when operated by actuators assembled in the work station.

9 Claims, 4 Drawing Sheets

US 6,474,460 B2

PROCESSING PLANT WITH DEVICE FOR HOLDING AND CENTERING BODIES IN PROCESSING STATIONS

BACKGROUND OF THE INVENTION

The present invention relates to a body or car processing plant with an innovative device for holding and centering bodies in processing stations. Processing is understood below to mean all processing operations such as welding, finishing and assembly of parts and completion with mechanical members, glass et cetera and dressing the car which can be performed on members such as motor car bodies or the like from purposeful as well as known work stations. By the term 'bodies' is meant cars in the completion stage and not only naked bodies.

In processing plants the need to report and accurately hold the position of the members being processed once they have reached an operating station is known. During body processing in the station there are however possible undesired movements which can be caused by the thrusts applied to the body by the processing equipment itself. In the prior art, holding clamps arranged in the station for grasping the body have been proposed but they are cumbersome, can obstruct processing and have to be shaped and positioned purposely for the particular body model. The general purpose of the present invention is to remedy the above mentioned shortcomings by making available a body processing plant in which the precision positioning members also fulfill the function of holding the body without further encumbrances in the station and with no need of independent holding members in the individual stations but keeping the individual conveyance devices simple and economical.

SUMMARY OF THE INVENTION

In view of this purpose it was sought to provide in accordance with the present invention a body or car processing plant with work stations and means of conveying bodies between work stations comprising reference members assembled on the conveyance means to support the body on the conveyance means during transfer between work stations characterized in that the reference members comprise means for grasping the body or car in completion and holding it steadily against them when operated by actuators mounted in the station.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
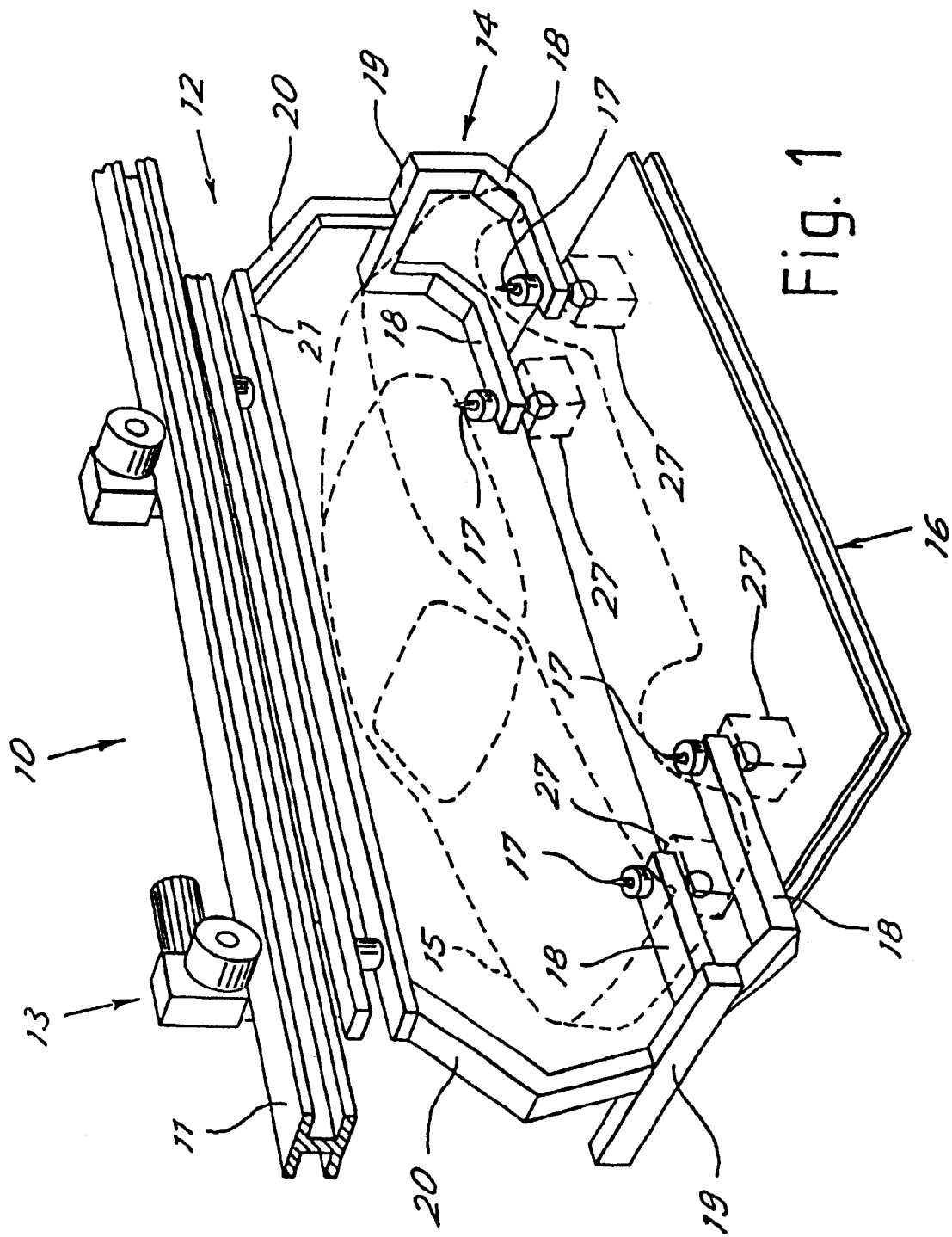
FIG. 1 shows a diagrammatic view of part of a body conveyance and processing plant having devices in accordance with the present invention.

With reference to the figures FIG. 1 partially illustrates a plant designated as a whole by reference number 10 comprising a conveyance plant made up of an overhead rail 11 on which run conveyance means 12 which are advantageously conveyors or self-propellers and have motors 13 and bearing hangers 14 for supporting the bodies 15 to be processed e.g. welded. The hanger conveyors convey the bodies or cars among a plurality of work stations or cells of which one designated by reference number 16 is shown in FIG. 1. A similar conveyor system and the processing equipment in the stations are well known to those skilled in the art and are therefore not further described or shown.

To support the body the hanger 14 comprises a frame 19, 20 with arms 18 from which support or reference members 17 on which the body is rested project above.

Figure 2:
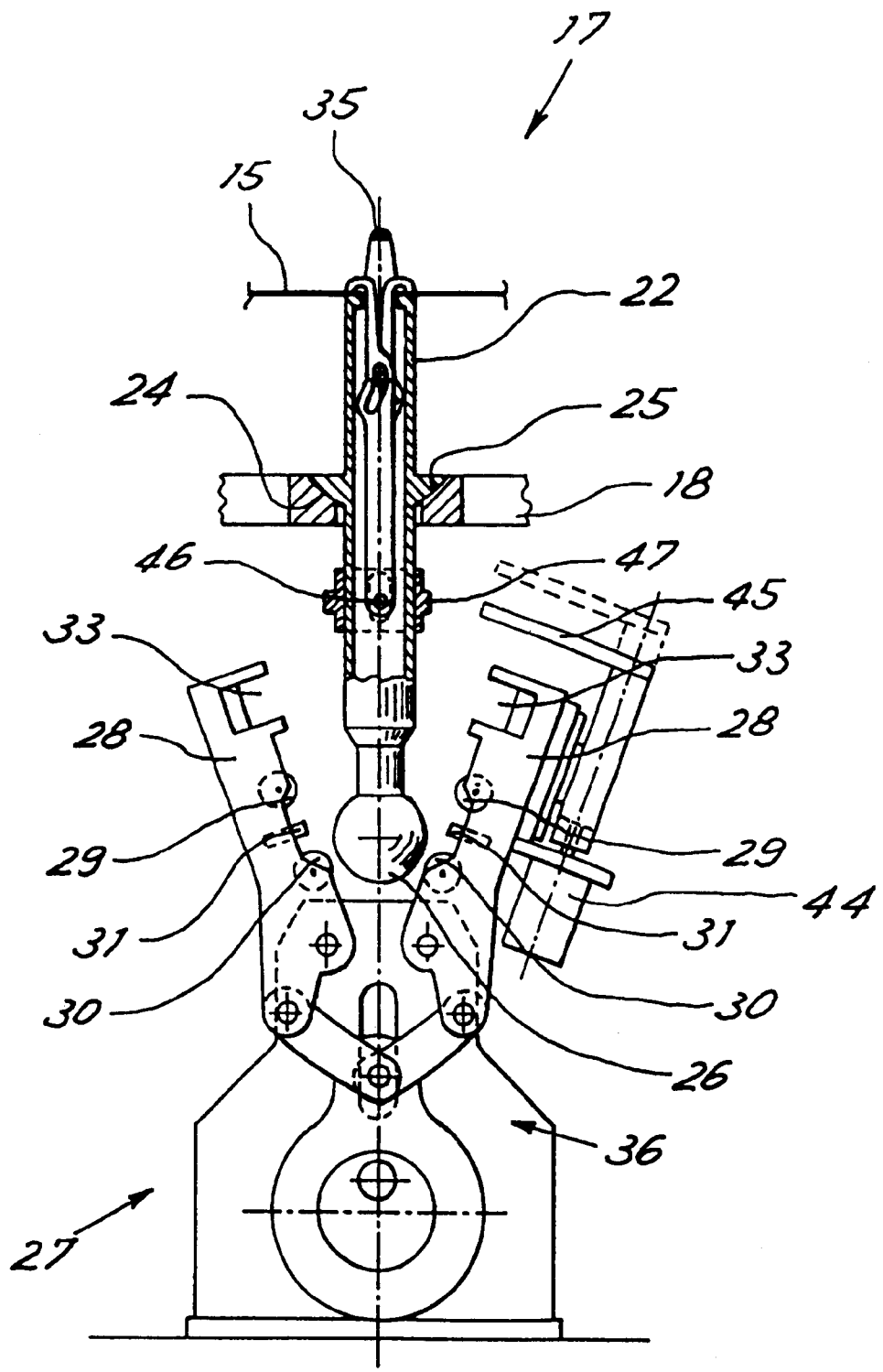
FIG. 2 shows a partially cross sectioned side elevation view of a positioning and holding device in accordance with the present invention.
Figure 3:
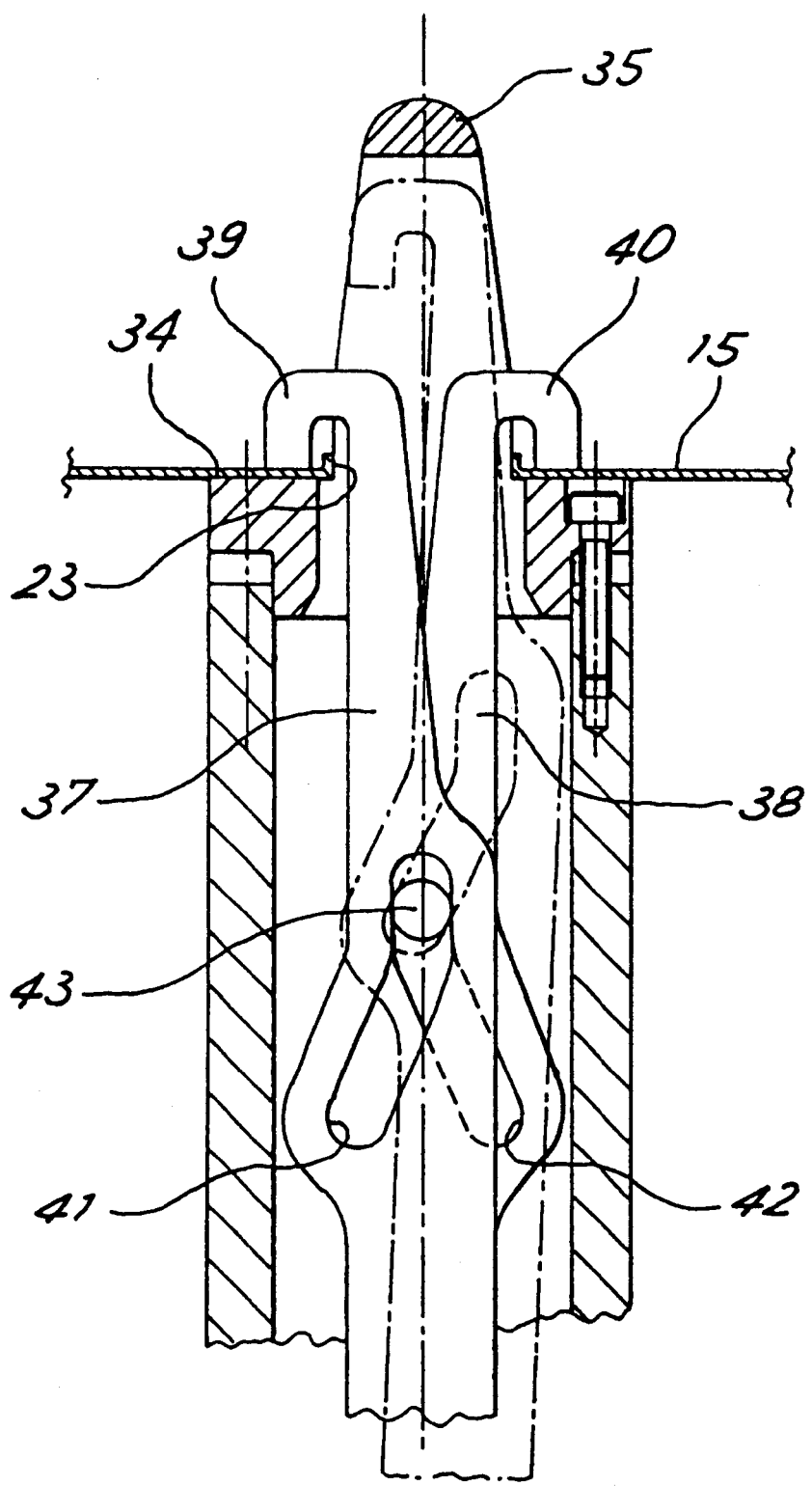
FIG. 3 shows an enlarged view of a detail of the device of FIG. 2, and FIGS. 4 and 5 show different operating positions of the device of FIG. 2.

As may be seen better in FIGS. 2 and 3 each support 17 includes a vertical stem 22 with a positioning pin 35 at its top end. The pin 35 has a tapered end—conical for example—and is designed to engage with minimal side play in an appropriate reference seat 23 in the body 15. At the base of the coupling pin 35 the stem 22 defines a table 34 for supporting the body. The combination of the table 34 and the pin 35 supplies a precise positioning reference for the body with respect to the stem 22.

As may be seen in FIG. 2 and enlarged in FIG. 3 the stem 22 is hollow and inside it are a pair of rods 37, 38 extending along the axis of the stem to end above in a clamp 39, 40 each and below in a handling end pivoted at 46 to a sleeve 47 mounted in a running manner on the outside of the stem 22.

In an intermediate position between its ends each rod has a slot 41, 42 shaped as a cam to run on a pin 43 fastened in the stem. The slot 41, 42 has a first vertical upper section and a second lower section inclined outwardly in the direction of the extension of the clamp associated with the rod. The slot is shaped so that when the sleeve 47 is in its lower rest position as shown in FIG. 2 and hence when the pin 43 is in the vertical section of the slot the clamps 39, 40 are arranged at the two sides of the positioning pin 35 with the grasping end resting on the positioning table 34 as may be seen in FIG. 3. As shown in dash-dot lines for the left-hand clamp in FIG. 3, by raising the sleeve 47 the cams provided by the slots 41, 42 and the pin 43 cause return of the clamps 39, 40 into the positioning pin 35.

To move the sleeve, actuators 44 are placed in the stations to grasp a corresponding sleeve upon arrival of a body and open or close the clamps as required for body loading, unloading or processing.

Advantageously as clarified below, the supports 17 are assembled transitorily on the hanger and protrude below with one of their spherical ends 26 to be grasped by grasping and positioning devices 27 arranged in the work stations. For support of the stem 22 on the hanger the stem 22 has a hemispherical fifth wheel 24 resting in a complementary seat 25 in the respective hanger arm 18. The stem 22 continues downward beyond the seat 25 and ends below in the above mentioned spherical end 26.

The grasping devices 27 are made with a pair of movable jaws 28 powered by a kinematic mechanism 36 to close on the lower end of the positioning member 17.

Each jaw comprises vertical rollers or bearings 29, 30 and a pair of rollers or bearings 31 arranged horizontally. The two rollers 31 of the pair of which only one is visible in the FIGS are arranged symmetrically with respect to a vertical plane passing through the two clamps. The rollers 29, 30 are designed to be arranged above and below the equatorial diameter of the sphere 26 and the rollers 31 are designed to rest on the sphere 26 side by side and in an intermediate position between the rollers 29, 30. In this manner upon closing of the jaws the center of the sphere 26 is positioned accurately in the device 27. The holding position is slightly raised over the position of the sphere 26 when the fifth wheel 24 is resting in the hanger seat 25 so that the positioning member 17 is raised and released by the hanger when it is grasped by the jaws 28. To prevent rotation of the sphere between the jaws and then position the upper end of the stem accurately the jaws have ends 33 which grasp the stem. Advantageously one of the jaws 28 supports the actuator 44 which operates a fork 45 to slide it axially to the stem 22 between the two positions shown respectively in solid and dash-dot lines in FIG. 2. The two positions allow the fork to position itself above or below the sleeve when the jaws are closed.

Figure 4:
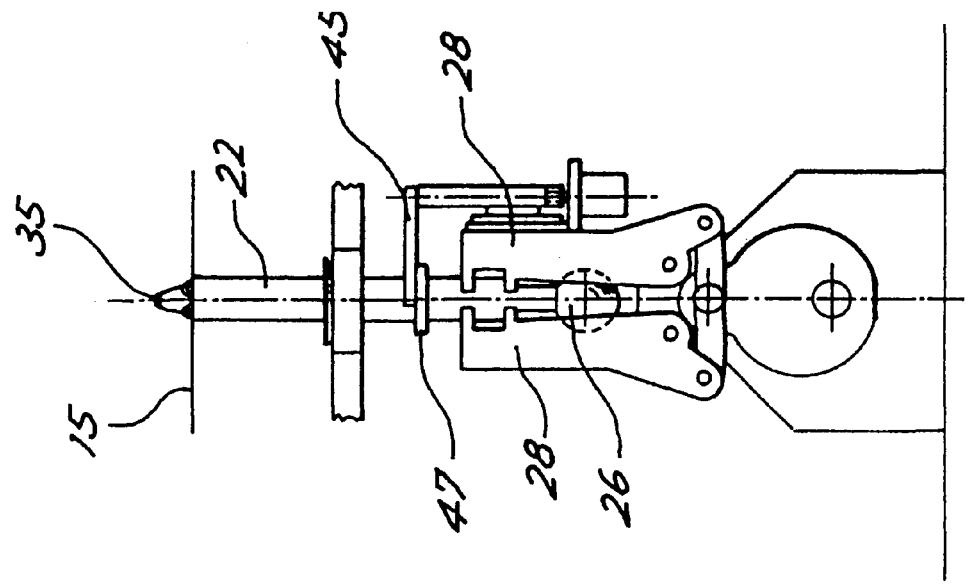
Figure 5:
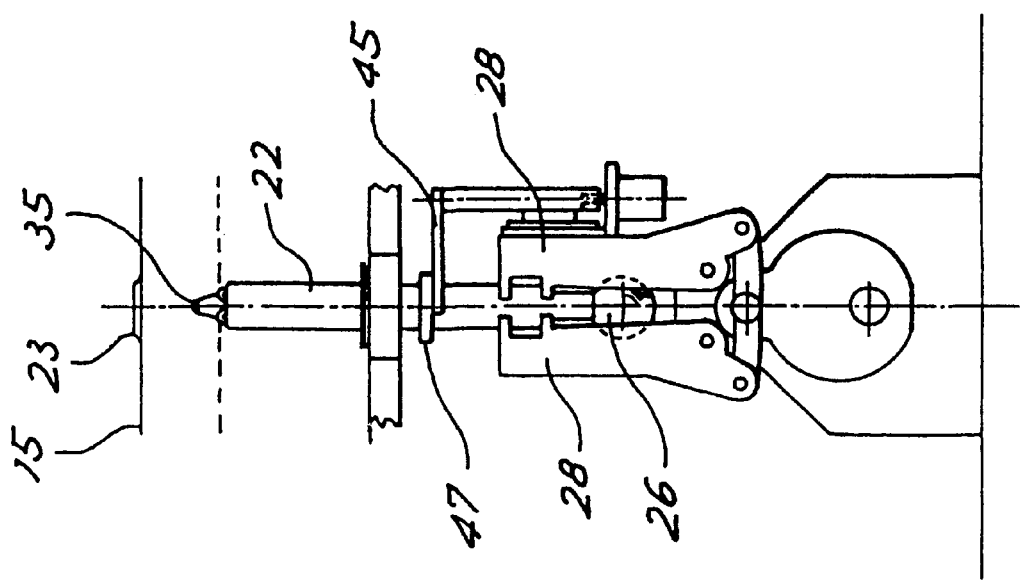

In use, to unload a body from the hanger or load a body on the hanger the hanger reaches a station 16 where grasping means 27 grasp the positioning members with the forks 45 lowered and then raise the forks to move the sleeves 47 upwards and draw in the clamps 39, 40 as shown in FIG. 4. In this manner a body can be freely placed on or removed from the pins 35.

After this the grasping means 27 are opened and the hanger can convey the body among the various processing stations. During conveyance the clamps are rested on the edges of the positioning hole 23 of the body (FIG. 2).

When the hanger reaches a processing station the grasping means 27 of the station close on the positioning members 17 to raise them from the seats 25 in the hanger and position them accurately with respect to the station. Closing of the jaws is however performed after operation upward of the actuator 44 so that the fork 45 is located over the sleeve 47. The actuator 44 is then operated downward so that the clamps 39, 40 firmly hold the body between them and the supporting table 34 to prevent all possibility of movement of the body with respect to the positioning members.

After the station has performed the programmed processing the actuator 44 raises the fork 45 and the grasping means 27 are opened so that the hanger can resume its travel towards the next station.

It is now clear that the predetermined purposes have been achieved to secure safe and accurate holding in accordance with all Cartesian axes. As the body is firmly grasped opposite the support and positioning members 17 the body remains fully accessible for processing in the various stations. In addition since the supporting points are standardizable and to a high degree independent of the body configuration different bodies can be treated without the need of modifying the support and holding structure. Even if body details require modifications in the position of the supports 17 the structure of the supports remains the same since the configuration of the bodies near the positioning holes does not vary significantly. The additional characteristic of using body supports mounted transitorily on the conveyor plant allows high precision regardless of the design and positioning accuracy of the conveyor system.

Naturally the above description of an embodiment applying the innovative principles of the present invention is given by way of non-limiting example of said principles within the scope of the exclusive right claimed here. For example the structure of the conveyance means can vary depending on specific exigencies. In particular overhead conveyor systems with or without incorporated vertical hoisting members for the load bearing support can be employed as well as skid, roller, chain, push-conveyor et cetera conveyance systems.

What is claimed is:

1. Body or car processing plant comprising:
  work stations and conveyance means for conveying bodies between said work stations, the conveyance means including reference members assembled on the conveyance means to support a body during transfer between said work stations, the work stations including grasping devices for grasping said reference members when the conveyance means are in a work station, the references members include body grasping means for grasping the body or car to be processed and holding the car or body steadily against the reference members when operated by actuators mounted in the work station.

2. plant in accordance with claim 1 wherein the reference members are assembled on the conveyance means transitorily and the grasping devices in the work stations grasp the reference members and position the reference members accurately, thus temporarily disengaging the reference members from the conveyance means to accurately position the body supported by the reference members in the work station.

3. Plant in accordance with claim 2 wherein the reference members comprise at the top a body support zone with a pin protruding from the support zone for insertion in a reference hole in the body and the reference members also comprise an intermediate zone for support of the member on the conveyance means and a lower zone with spherical surface with the grasping devices comprising jaws movable between an open position for free passage of the reference member and a closed position for grasping the spherical surface for lifting the intermediate support zone and accurate positioning of the spherical surface with the jaws also comprising surfaces acting against the reference members upon closing of the jaws for accurate angular positioning of the member around the center of the spherical surface.

4. Plant in accordance with claim 3 wherein the body grasping means comprise a pair of clamps moving between a withdrawn rest position in said pin for insertion in the hole in the body and a hold position above the support zone, each clamp is supported at the end of a rod running inside the reference member with the rod being connected to a sliding control sleeve arranged outside the reference member to be graspable by the above mentioned actuators assembled in the station for movement of the rod between the rest and hold positions and said actuators comprise a fork for engagement of the sleeve which is arranged on one of said jaws to approach the sleeve upon closing of the jaws on the reference member.

5. Plant in accordance with claim 4 wherein the actuator moves the fork between a position above the sleeve and a position below the sleeve to move the sleeve respectively downward to close said clamps towards the support zone or upward to take the clamps into the rest position.

6. Plant in accordance with claim 1 wherein the reference members comprise at the top a body support zone with a pin protruding from the support zone for insertion in a reference hole in the body.

7. Plant in accordance with claim 6 wherein the body grasping means comprise a pair of clamps moving between a withdrawn rest position in said pin for insertion in the hole in the body and a hold position above the support zone.

8. Plant in accordance with claim 7 wherein each clamp is supported at the end of a rod running inside the reference member with the rod being connected to a sliding control sleeve arranged outside the reference member to be graspable by the above mentioned actuators assembled in the station for movement of the rod between the rest and hold positions.

9. Plant in accordance with claim 8 wherein between the rod and the reference member there are cam surfaces shaped to move the clamp between the rest-and hold positions upon vertical running of the rod.

* * * * *